(12) United States Patent
Frank

(10) Patent No.: US 10,941,544 B2
(45) Date of Patent: Mar. 9, 2021

(54) WARNING SYSTEM FOR A WORKING MACHINE

(71) Applicant: Volvo Construction Equipment AB, Eskilstuna (SE)

(72) Inventor: Martin Frank, Mehlingen (DE)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 16/322,208

(22) PCT Filed: Aug. 24, 2016

(86) PCT No.: PCT/SE2016/050789
§ 371 (c)(1),
(2) Date: Jan. 31, 2019

(87) PCT Pub. No.: WO2018/038654
PCT Pub. Date: Mar. 1, 2018

(65) Prior Publication Data
US 2019/0161943 A1   May 30, 2019

(51) Int. Cl.
*E02F 9/26* (2006.01)
*B60Q 1/50* (2006.01)
*E02F 3/32* (2006.01)

(52) U.S. Cl.
CPC .............. *E02F 9/261* (2013.01); *B60Q 1/50* (2013.01); *E02F 9/264* (2013.01); *B60Q 2400/50* (2013.01); *E02F 3/32* (2013.01)

(58) Field of Classification Search
CPC . B25J 19/06; B60Q 1/245; B60Q 1/50; B60Q 2400/50; B60R 1/00; B66C 13/54;
(Continued)

(56) References Cited

U.S. PATENT DOCUMENTS 6,025,778 A    2/2000  Dietz et al.
7,741,961 B1 * 6/2010  Rafii ..................... B60Q 9/005
                                                340/435
(Continued)

FOREIGN PATENT DOCUMENTS

CN    103419714 A    12/2013
DE     10240227 A1    3/2004
(Continued)

OTHER PUBLICATIONS

International Search Report and Written Opinion of the International Searching Authority, PCT/SE2016/050789, dated May 11, 2017, 13 pages.
(Continued)

*Primary Examiner* — Stephen R Burgdorf
(74) *Attorney, Agent, or Firm* — Sage Patent Group

(57) ABSTRACT

A warning system for a working machine including a movable load unit arrangement is disclosed. The warning system includes an illumination arrangement arranged to illuminate an area externally of the working machine and a load unit position prediction means arranged to determine a position of the load unit arrangement at a future point in time. The illumination arrangement is arranged to illuminate the area on the basis of the determined future position of the load unit arrangement.

14 Claims, 7 Drawing Sheets

(58) Field of Classification Search
CPC .. E02F 3/32; E02F 9/261; E02F 9/264; G05B 19/409; G08B 21/02
USPC .......................................................... 340/463
See application file for complete search history.

(56) References Cited

U.S. PATENT DOCUMENTS

| | | | |
|---|---|---|---|
| 9,303,390 B2 * | 4/2016 | Nagato | E02F 3/435 |
| 2002/0140551 A1 * | 10/2002 | Gutta | B60Q 9/008 |
| | | | 340/435 |
| 2005/0000703 A1 * | 1/2005 | Furuno | G01G 19/08 |
| | | | 172/2 |
| 2012/0025964 A1 | 2/2012 | Beggs et al. | |
| 2013/0187785 A1 | 7/2013 | McIntosh et al. | |
| 2016/0046289 A1 | 2/2016 | Elbs | |
| 2016/0078340 A1 * | 3/2016 | Kirsch | G06N 5/022 |
| | | | 706/12 |
| 2017/0043988 A1 * | 2/2017 | Lee | B66F 17/003 |
| 2017/0073925 A1 * | 3/2017 | Friend | E02F 9/205 |
| 2017/0106836 A1 * | 4/2017 | Sobecki | B60Q 1/0023 |
| 2017/0203685 A1 * | 7/2017 | Hirai | B60Q 1/0023 |
| 2017/0210282 A1 * | 7/2017 | Rodriguez Barros | G03B 21/00 |
| 2020/0150650 A1 * | 5/2020 | Jarlengrip | G06K 9/00791 |

FOREIGN PATENT DOCUMENTS

| | | | |
|---|---|---|---|
| DE | 102011119923 A1 | 5/2013 | |
| DE | 112013005542 T5 | 8/2015 | |
| DE | 20 2016 004 062 U1 * | 8/2016 | ............... B60Q 1/50 |
| DE | 202016004062 U1 | 9/2016 | |
| EP | 2746105 A1 | 6/2014 | |
| EP | 2801393 A1 | 11/2014 | |
| EP | 2985182 A2 | 2/2016 | |
| JP | 2006276051 A | 10/2006 | |
| WO | WO 2015058776 A1 | 4/2015 | |

OTHER PUBLICATIONS

Extended European Search Report dated Mar. 12, 2020 for European Patent Application No. 16914325.2, 9 pages.

* cited by examiner

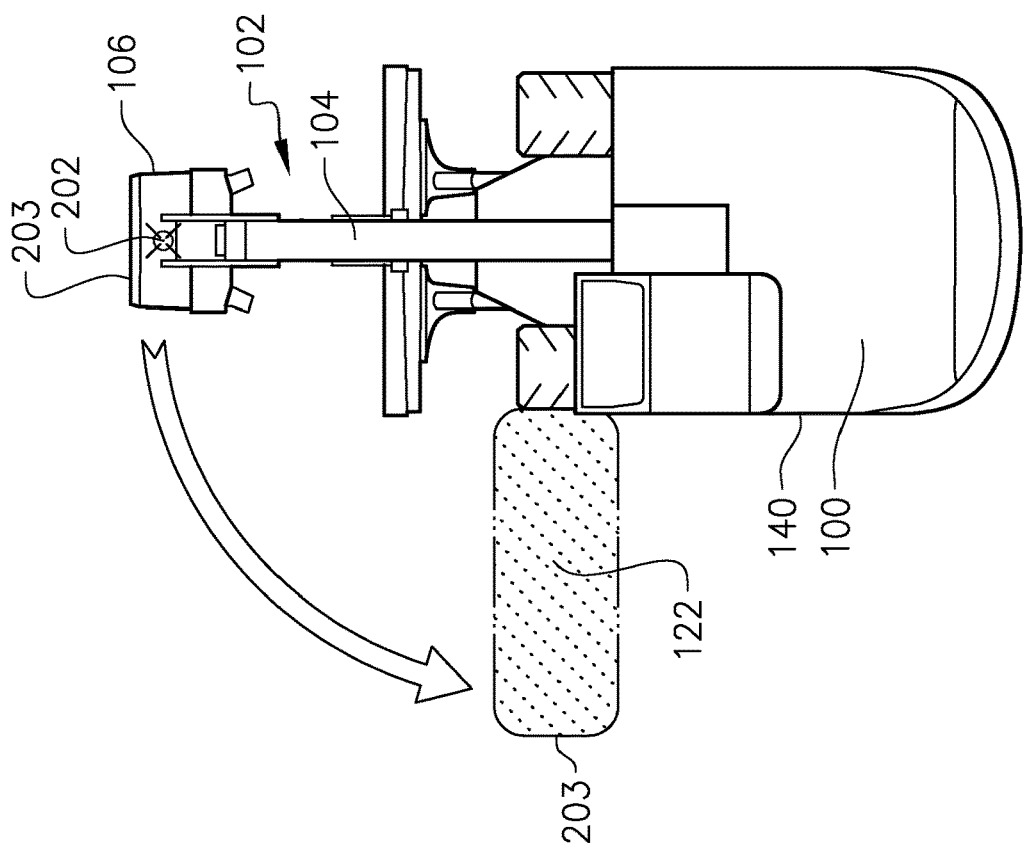
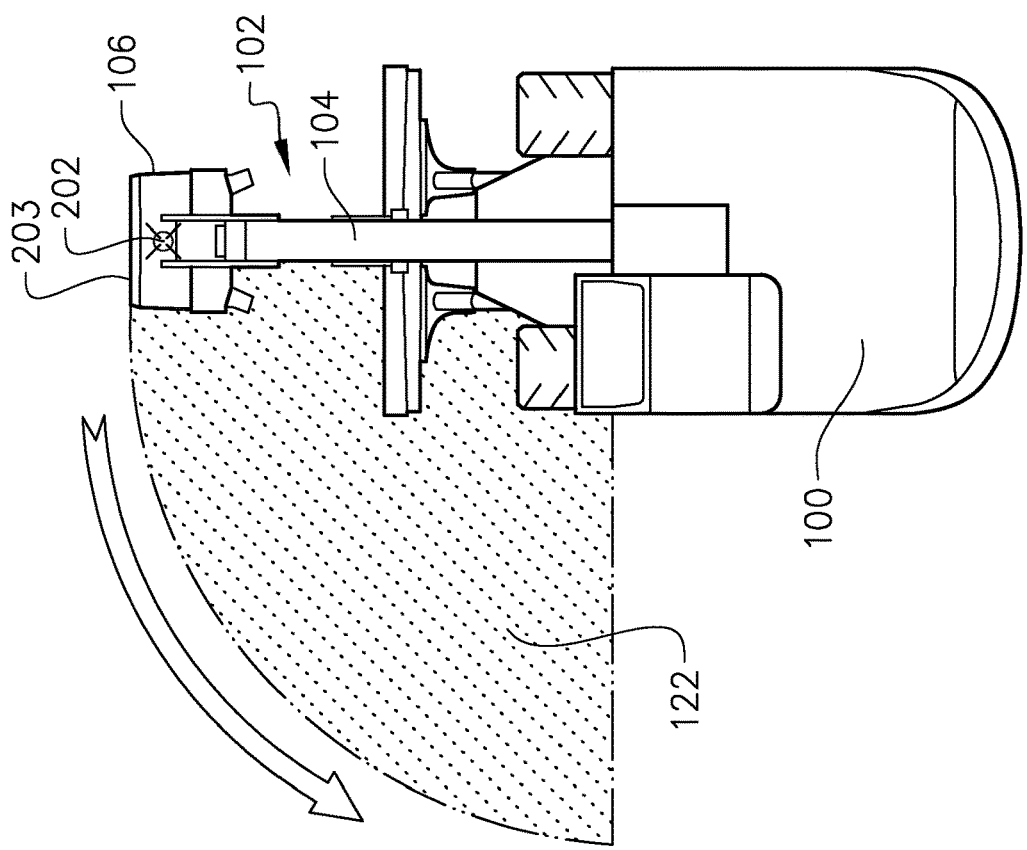
FIG. 2c
FIG. 2d

WARNING SYSTEM FOR A WORKING MACHINE

CROSS REFERENCE TO RELATED APPLICATIONS

This application is a 35 U.S.C. § 371 national stage application of PCT International Application No. PCT/SE2016/050789 filed on Aug. 24, 2016, the disclosure and content of which is incorporated by reference herein in its entirety.

TECHNICAL FIELD

The present invention relates to a warning system for a working machine. The invention also relates to a method and a control unit for controlling a warning system for a working machine, as well as a working machine comprising such a warning system. The invention is applicable on vehicles, in particularly working machines provided with a movable load unit arrangement, such as e.g. an excavator. Although the invention will mainly be described in relation to an excavator, it may also be applicable for other type of working machines such as e.g. wheel loaders, dump trucks, pipelayer machines, etc.

BACKGROUND

In connection to construction sites or the like, working machines often execute work in close proximity to workers when, for example, loading and unloading a cargo from a trailer, etc. Persons at such construction sites are working in a relatively dangerous environment. There is a potential risk for accidents and dangerous situations when being in the vicinity of large and heavy working machines. Such situations may, for example, relate to a misjudgement of the operator of the working machine, or that the operator of the working machine is not visually keeping track of the persons working close to the working machine, etc.

Furthermore, persons working in close proximity to the working machines may also be distracted and not keeping full track of the actions performed by the working machines. This may, for example, be the case when an excavator moves an implement by rotating an upper body in relation to a lower body thereof. In such a situation, there is an increased risk that the persons in the vicinity of the excavator are not aware of the moving implement and thus being exposed to an increased safety risk.

Based on the above, there is thus a need to improve the safety at construction sites in order to reduce injuries to persons at the construction site.

SUMMARY

It is an object of the present invention to provide a warning system which at least partially overcomes the deficiencies of the prior art. This is achieved by a warning system according to claim 1.

According to a first aspect of the present invention, there is provided a warning system for a working machine, the working machine comprising a movable load unit arrangement, the warning system comprising an illumination arrangement arranged to illuminate an area externally of the working machine; wherein the warning system further comprises a load unit position prediction means arranged to determine a position of the load unit arrangement at a future point in time, the illumination arrangement being arranged to illuminate the area on the basis of the determined future position of the load unit arrangement.

The wording "movable load unit arrangement" should in the following and throughout the entire description be interpreted as an arrangement of the working machine which is arranged to move a load or the like. According to non-limiting examples, the movable load unit arrangement may comprise a boom arm and an implement for an excavator or a wheel loader. The movable load unit arrangement may also comprise a container of a dump truck, the blade of a grader or a dozer, etc. Also, the movable load unit arrangement should be understood to be movable relative to the ground surface onto which the working machine operates.

Moreover, the illumination arrangement should be understood to mean an arrangement or a device which is capable of providing a visible warning illumination, preferably for persons in the vicinity of the working machine. The illumination arrangement may comprise different type of light sources, such as e.g. light emitting diodes (LED), or an array of LEDs, etc. Other alternatives are of course conceivable, such as e.g. lasers, etc. The illumination arrangement may also be arranged to provide a movable illumination in relation to the working machine. Hence, the illumination arrangement can controllably illuminate different positons in the vicinity of the working machine irrespective of the specific position of the working machine. Also, the illumination arrangement can provide a visual illumination at different distances from the working machine. For example, the illumination arrangement may be able to both illuminate a position in close proximity to a body structure of the working machine, as well as a position a distance away from the body structure. Furthermore, the illumination arrangement may also provide an indication pattern of a hazardous situation, such as e.g. a visual indication pattern in the form of an attention sign or the like which clearly visually indicates an area that should not be occupied, etc. Such visual indication may also comprise a text stating "do not enter" or other suitable warning messages, or a specific color which clearly indicates that the area should not be occupied.

An advantage of the present invention is that the intended movement or end position of the movable load unit arrangement can be visibly available for e.g. workers and other machine operators operating in the vicinity of the working machine. Accordingly, workers and machine operators in the vicinity of the working machine will be visually notified of a potentially hazardous upcoming situation that might be associated with the movement of the load unit arrangement. An improved safety for workers at the construction site is thus provided.

According to an example embodiment, the illumination arrangement may be arranged to illuminate the area prior to the load unit arrangement arrives at the determined future position.

Hereby, persons in the vicinity of the working machine can be notified/warned about the load unit arrangement before it arrives at the determined future position. An advantage is thus that the persons will be given time to move away from the potentially hazardous area.

According to an example embodiment, the illumination arrangement may be arranged to illuminate a ground surface, the illuminated ground surface comprises a vertical projection of the determined future position.

An advantage is that the hazardous area is clearly visually illustrated on the ground such that persons in the vicinity of the working machine are aware of where to avoid potential injuries. The ground surface also constitutes an illuminable area always available in the vicinity of the working machine.

According to an example embodiment, the illumination arrangement is arranged to illuminate a ground surface, the illuminated ground surface comprises a vertical projection of an outermost position of the load unit arrangement at the future point in time.

The outermost position of the load unit arrangement may often be provided with an implement or the like, which is arranged to carry a relatively heavy load. Also, during rotation of the working machine, the velocity of the load unit arrangement is fastest at the outermost position. It may therefore be most critical to avoid collision with the outermost position of the load unit arrangement.

According to an example embodiment, the illuminated ground surface may form an area corresponding to the shape of the load unit arrangement.

Hereby, the visual warning is further improved as the shape of the load unit arrangement forms an intuitive indication that the load unit arrangement will be moved to the future position.

According to an example embodiment, the illuminated ground surface may form an area between the vertical projection of the outermost position of the load unit arrangement and a body structure of the working machine.

An advantage is that a warning to not stand between the position of the implement and the working machine is provided, since also the working machine, and its movement, may constitute a hazardous object for persons in the vicinity thereof.

According to an example embodiment, the illuminated ground surface may have an area corresponding to a vertical projection of a swept area formed by the movement of the load unit arrangement from a present position towards the determined future position.

Hereby, not only the final determined future position is provided with an illuminated warning indication, but also the area constituted by the movement of the load unit arrangement is provided with an illuminated warning indication. For example, a load unit arrangement of an excavator may comprise a load arm and an implement, which can be moved in a rotational manner relative to the ground surface. An advantage is that a reduced risk of being injured by the load arm and/or the implement is provided when the load arm and the implement are moved from the present position towards the determined future position.

According to an example embodiment, the load unit position prediction means may be connectable to an operator command module, wherein the load unit position prediction means is adapted to receive a control signal from the operator command module, the control signal being indicative of the future position of the load unit arrangement.

The wording "operator command module" should be understood to mean a module receiving various input commands from an operator of the working machine. Hereby, the future position of the load unit arrangement can be determined based on the various inputs provided by the operator.

According to an example embodiment, the operator command module may be connected to an operator command device controlled by the operator of the working machine, wherein the future position of the load unit arrangement is determined based on a load intensity exerted on the operator command device.

The "operator command device" may, for example, be a joystick or the like for controlling motions of the load unit arrangement. An advantage is that if the operator increases the load intensity of the operator command device, i.e. pushes the joystick relatively hard, this is an indication that the load unit arrangement should be moved to a future position relatively far away from the present position. On the other hand, if the load intensity is relatively low, this is an indication that the load unit arrangement should be moved to a future position relatively close to the present position. The load intensity of the operator command device may also be an indication of the speed of motion of the load unit arrangement. In addition, or as a complement, the future position of the load unit arrangement may be determined based on an amount of deflection of the operator command device, i.e. how much the operator deflects the joystick. In such case, a large deflection indicates a future position relatively far away from the present position, while a small deflection indicates a future position relatively close to the present position.

According to an example embodiment, the load unit position prediction means may be connectable to an implement load detection module, wherein the load unit position prediction means is adapted to determine a time period from a present point in time to said future point in time for the movement of the load unit arrangement based on a signal received from the implement load detection module.

The implement load detection module is arranged to determine a load carried by e.g. the implement of the load unit arrangement. The load may be determined by a load sensor or by measuring the hydraulic pressure in the hydraulic system. An advantage of determining the load carried by the load unit arrangement is that an indication of how fast the load unit arrangement will reach the future position can be provided. Hereby, the visual warning may be controlled and adapted based on the urgency thereof.

According to an example embodiment, the load unit position prediction means may be connectable to a driving direction module arranged to determine a driving direction of the working machine, wherein the future position of the load unit arrangement is based on the determined driving direction of the working machine.

The driving direction may be determined based on e.g. sensor inputs from the steering wheel of the working machine, alone or in combination with the vehicle speed determination. The driving direction may also be determined by means of externally positioned sensors on the working machine, which are arranged to detect the movement direction of the working machine. An advantage is that also the movement of the working machine relative to the ground surface can be used when determining the future position of the load unit arrangement. For example, if the working machine turns left at the same as the load unit arrangement rotates relative to the body structure of the working machine, the future position of the load unit arrangement is dependent on both the driving direction of the working machine as well as the rotation of the load unit arrangement. Further accuracy when determining the future position is thus provided. Also, persons which at a present point in time are not positioned in the vicinity of the working machine but at the future point in time will be occupying a hazardous area due to the movement of the working machine, can be provided with the visual warning message. As a further example, when the working machine drives straight ahead, the potentially hazardous area may be located relatively far ahead of the working machine compared to the position of the working machine at the present point in time, why it may be advantageous to warn persons currently occupying this area.

According to an example embodiment, the load unit position prediction means may be connectable to a load unit movement look-up table configured to store positions of the load unit arrangement, the stored positions correspond to respective operator commands from an operator of the working machine, wherein the future position of the load unit arrangement is based on an operator command and a corresponding stored position of the load unit movement look-up table.

Hereby, the system can be provided with intelligence and determine a future position based on previous operator commands.

According to a second aspect of the present invention, there is provided a method for controlling a warning system of a working machine, the working machine comprising a movable load unit arrangement, the warning system comprising an illumination arrangement arranged to illuminate an area externally of the working machine; wherein the method comprises the steps of receiving a signal indicative of a moving operation of the load unit arrangement; determining a future position of the load unit arrangement based on the received signal of the moving operation of the load unit arrangement; and controlling the illumination arrangement to illuminate the area on the basis of the determined future position.

Effects and features of the second aspect are largely analogous to those described above in relation to the first aspect of the present invention. In particular, the example embodiments described in relation to the first aspect of the present invention are equally applicable for the method according to the second aspect of the present invention.

According to a third aspect of the present invention, there is provided a control unit arranged to control a warning system of a working machine, the working machine comprises a movable load unit arrangement, wherein the warning system comprises an illumination arrangement arranged to illuminate an area externally of the working machine; wherein the control unit is configured to receive a signal indicative of a moving operation of the load unit arrangement; determine a future position of the load unit arrangement based on the received signal of the moving operation of the load unit arrangement; and control the illumination arrangement to illuminate the area on the basis of the determined future position.

Effects and features of the third aspect are largely analogous to those described above in relation to the first aspect of the present invention. In particular, the example embodiments described in relation to the first aspect of the present invention are equally applicable for the control unit according to the third aspect of the present invention.

According to a fourth aspect of the present invention, there is provided a working machine comprising a movable load unit arrangement, wherein the working machine comprises a warning system according to any of the example embodiments described above in relation to the first aspect of the present invention.

According to an example embodiment, the working machine may be an excavator and the load unit arrangement may comprise a boom arm and an implement.

According to an example embodiment, the excavator may comprise an upper and a lower structure, wherein the load unit arrangement is arranged on the upper structure and movable relative the lower structure.

According to fifth aspect of the present invention, there is provided a computer program comprising program code means for performing the steps described above in relation to the second aspect of the present invention when the program is run on a computer.

According to a sixth aspect of the present invention, there is provided a computer readable medium carrying a computer program comprising program means for performing the steps described above in relation to the second aspect of the present invention when the program means is run on a computer.

Further effects and features of the fourth, fifth and sixth aspects of the present invention are largely analogous to those described above in relation to the first aspect of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein:

FIGS. 2a-2d illustrate various areas illuminated by the warning system according to example embodiments of the present invention;

DETAILED DESCRIPTION OF EXAMPLE EMBODIMENTS OF THE INVENTION

Figure 1:
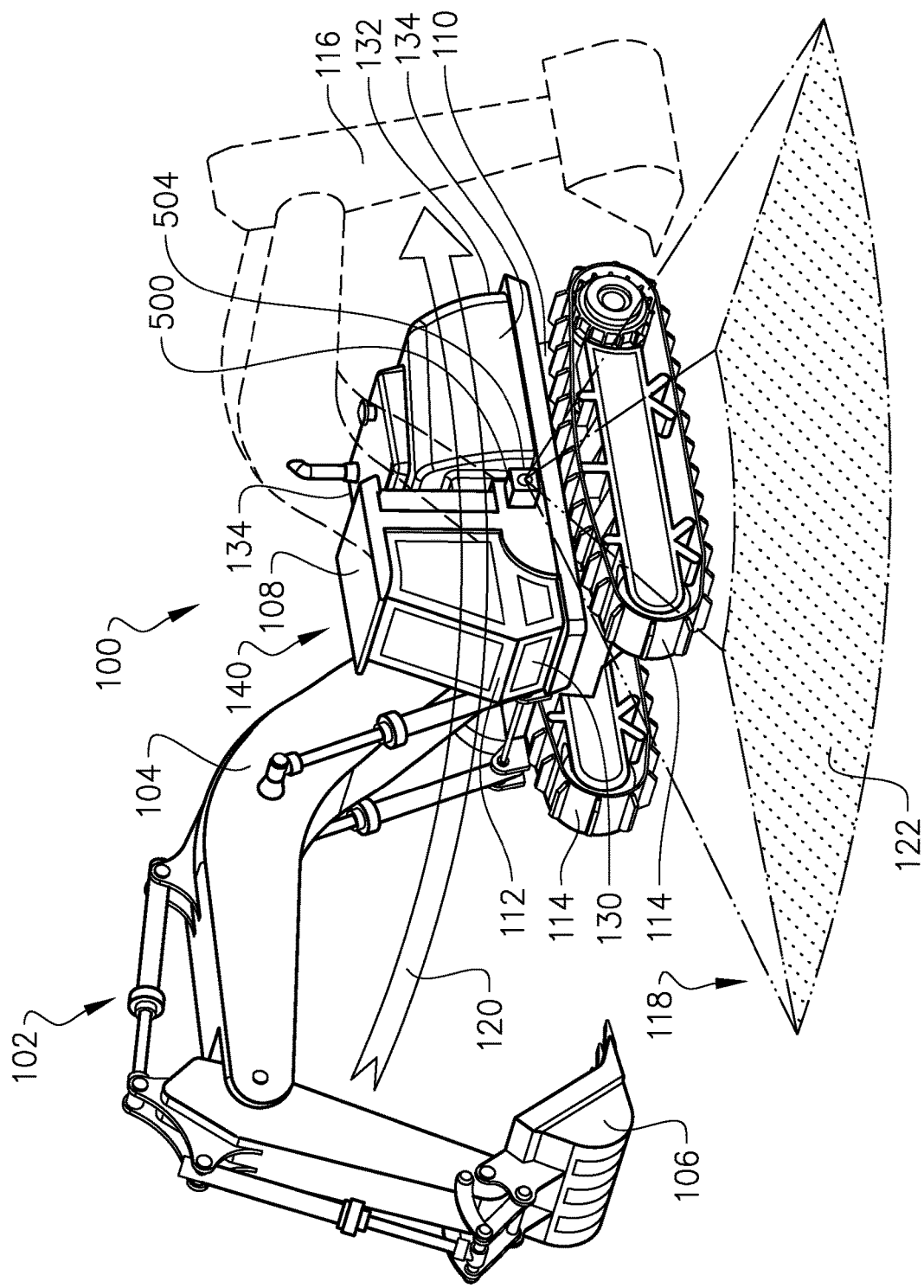
FIG. 1 is a perspective view of a working machine in the form of an excavator provided with a warning system according to an example embodiment of the present invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a working machine 100 in the form of an excavator 100. The excavator 100 comprises movable load unit arrangement 102, which movable load unit arrangement 102 comprises a boom arm 104 and an implement 106. In the embodiment depicted in FIG. 1, the implement 106 is a bucket, although other implements are conceivable as well, such as e.g. a gripping tool, etc. The excavator 100 comprises an upper structure 108 and a lower structure 110, wherein the upper 108 and lower 110 structures are movable relative to each other. In detail, the upper structure 108 can rotate relative the lower structure 110 around a substantially vertical geometric axis (not shown). The load unit arrangement 102 is connected to the upper structure 108 of the excavator 100 which makes it rotatably movable relative to the lower structure 110 as well as relative to the ground surface 118 thereof. The load unit arrangement 102 can also be lifted and lowered relative to the ground surface 118 such that the distance between the implement 106 and the ground surface 118 increases/reduces. Also, the implement 106 can be tilted relative to the boom arm 104. As further illustrated in FIG. 1, the upper structure 108 comprises a cabin 112 for housing an operator of the excavator 100, while the lower structure 110 comprises a pair of ground engaging members 114 in the form of caterpillar treads 114. Other ground engaging members 114 are also conceivable, such as e.g. wheels, etc.

As described, the load unit arrangement 102 is movable relative to the lower structure 110, as well as relative to the ground surface 118. FIG. 1 depicts the movement from a first, present point in time at which the load unit arrangement 102 is depicted with solid lines, to a future point in time. The load unit arrangement 102 is depicted with dashed lines 116 at the future point in time. The movement from the present position to the future position is depicted by arrow 120.

The working machine 100 further comprises a warning system 500. A detailed description of the warning system 500 and how it is connectable to various modules of the working machine 100 is given in relation to the description of FIG. 5 below.

The warning system 500 comprises a load unit position prediction means 502 (see FIG. 5) and an illumination arrangement 504. The load unit position prediction means 502 is arranged to determine a position of the load unit arrangement 102 at the future point in time. In the example depicted in FIG. 1, the load unit position prediction means 502 has determined that the load unit arrangement 102 will be moved from the position at the present point in time to the future position indicated with dashed lines 116. Thus, the load unit position prediction means 502 has determined that the load unit arrangement 102 will follow the movement indicated by the arrow 120. The load unit position prediction means 502 preferably determines the future position before the movement at the present point in time is initiated, or at the beginning of the movement. Further details of how the load unit position prediction means 502 determine the future position is given below in relation to the description of FIG. 5.

As stated above, the warning system 500 also comprises an illumination arrangement 504. The illumination arrangement 504 is arranged to illuminate an area externally of the working machine 100. Preferably, the area is the ground surface 118 in the vicinity of the working machine 100. Based on the future position of the load unit arrangement 102 determined by the load unit position prediction means 502, the illumination arrangement 504 illuminates an area/ground surface 122 externally of the working machine 100. In the illustrated example in FIG. 1, the illuminated ground surface 122 corresponds generally to a vertical projection of the swept movement by the boom arm 104 and the implement 106 when the load unit arrangement 102 is moved in the direction of the arrow 120. Further details of various alternative ways of illuminating the ground surface 118 are given below in relation to the description of FIGS. 2a-2d.

Figure 3:
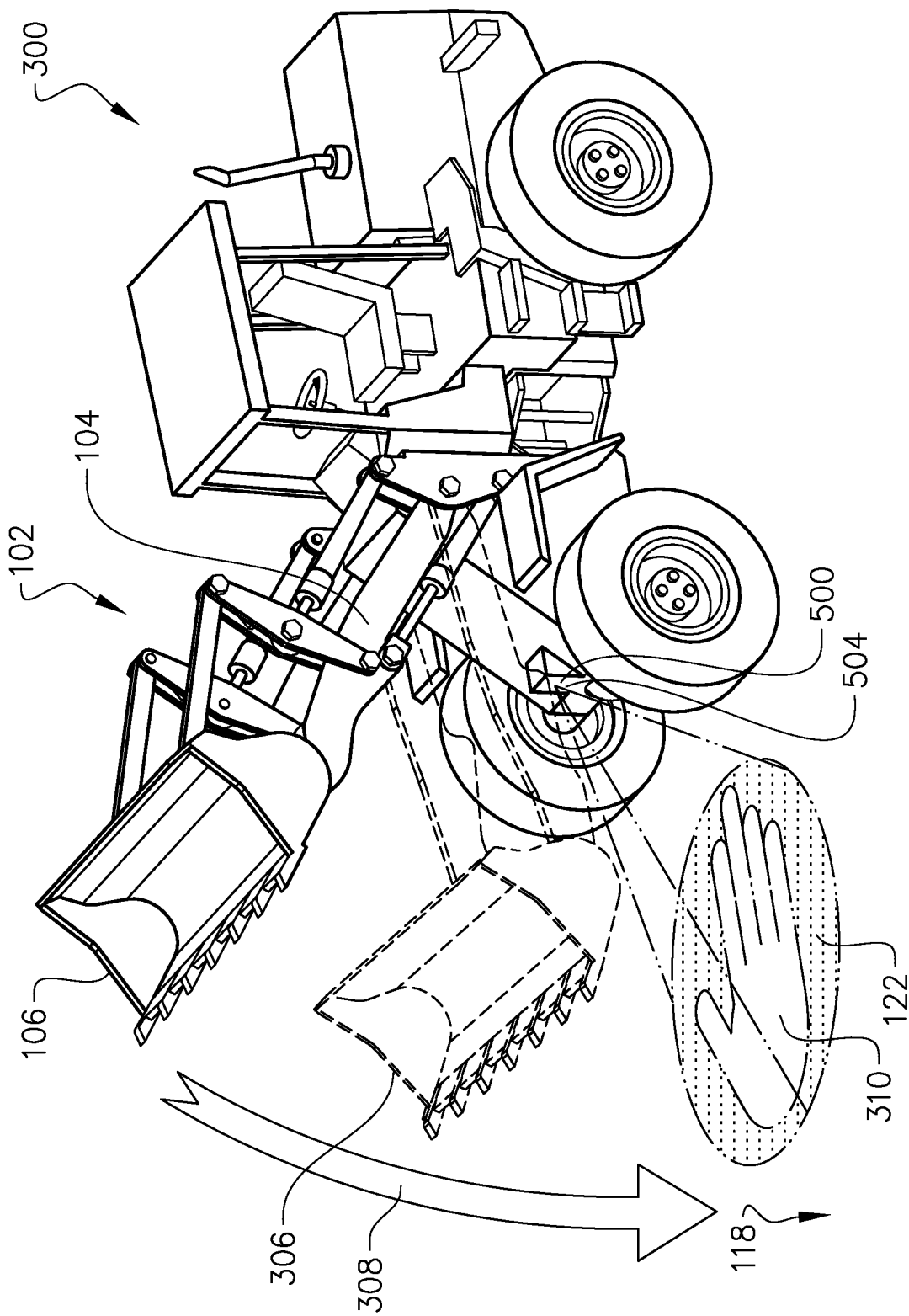
FIG. 3 is a perspective view of a working machine in the form of a wheel loader provided with a warning system according to an example embodiment of the present invention.
Figure 4:
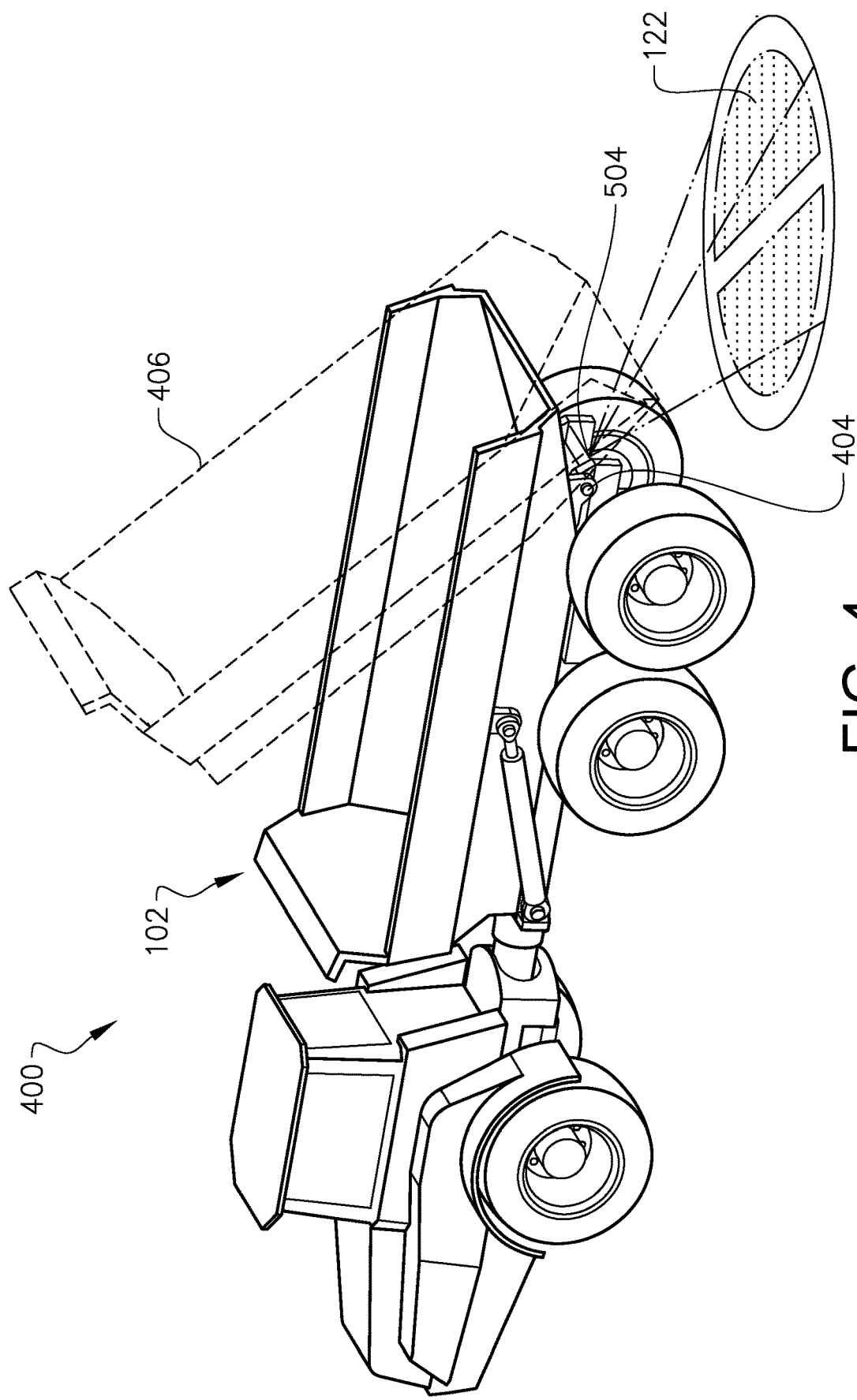
FIG. 4 is a perspective view of a working machine in the form of a dump truck provided with a warning system according to an example embodiment of the present invention.

By means of the illumination arrangement 504, and in particular the illuminated ground surface 122 externally of the working machine 100, persons occupied in the vicinity of the working machine 100 are given a visual warning indication of the moving load unit arrangement 102. Hence, by illuminating the area 122, a clear indication is given that the specific area should not be entered and persons unintentionally standing on the illuminated ground surface 122 will quickly understand that they should leave the illuminated ground surface 122. The illuminated ground surface 122 may also be illuminated with specific warning indications, such as a warning text message or an illustration of a clear indication of a hazardous area. Examples are illustrated in FIGS. 3 and 4.

The illumination arrangement 504 can comprise a plurality of light sources arranged at various positions of the working machine 100. For example, the working machine 100 may be provided with light sources of the illumination arrangement 504 also at the front side 130, the rear end 132 as well as on both lateral sides 134 of the body structure 140 of the working machine 100.

Turning now to FIGS. 2a-2d, illustrating different alternative embodiments of how to illuminate the ground surface externally of the working machine 100. The working machine 100 is also in FIGS. 2a-2d an excavator 100, which excavator 100 is seen from above in the figures. The load unit arrangement 102 is in FIGS. 2a-2d moved from a present position 202 to a future position 204.

Figure 2A:
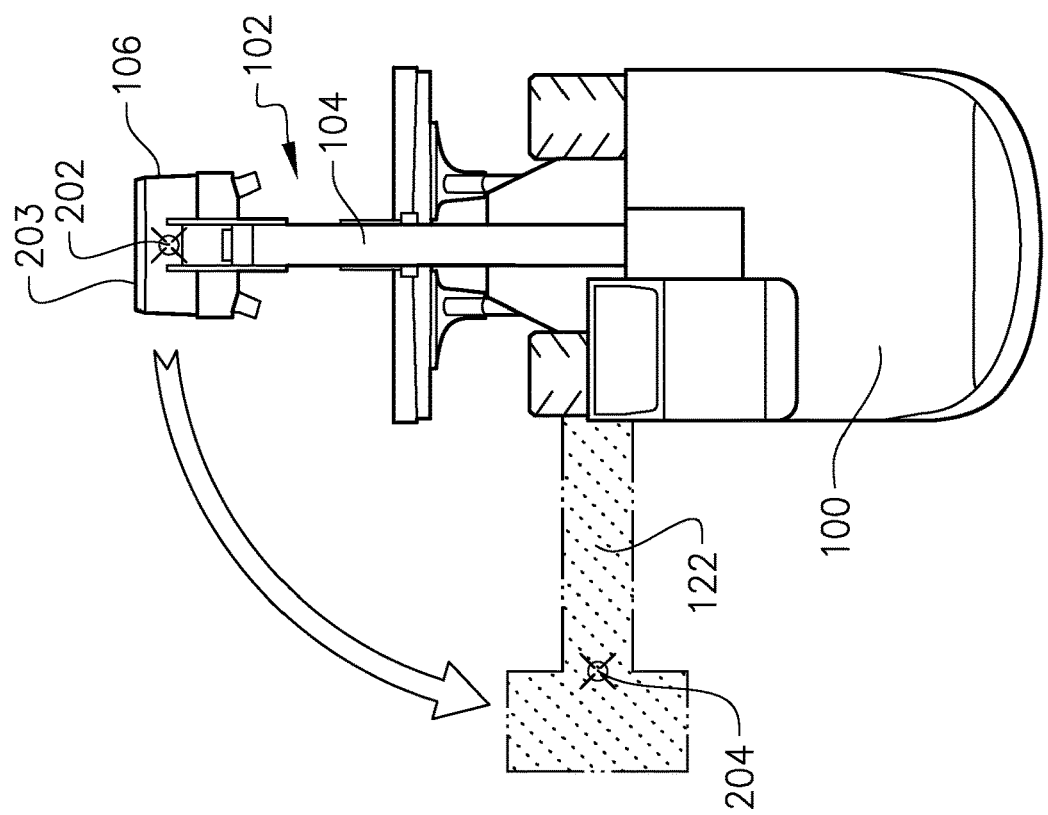

Starting with FIG. 2a, the illumination arrangement 504 illuminates an area at the future position 204 of the load unit arrangement 102. The illuminated ground surface 122 in FIG. 2a comprises a vertical projection of the determined future position 204 of the load unit arrangement 102. Moreover, the illuminated ground surface 122 depicted in FIG. 2a preferably comprises a vertical projection of an outermost position 203 of the load unit arrangement 102. The outermost position 203 of the load unit arrangement 102 preferably comprises the above described implement 106. Hereby, the illuminated ground surface 122 in FIG. 2a is arranged to visually illustrate the future position of the implement 106.

Figure 2B:
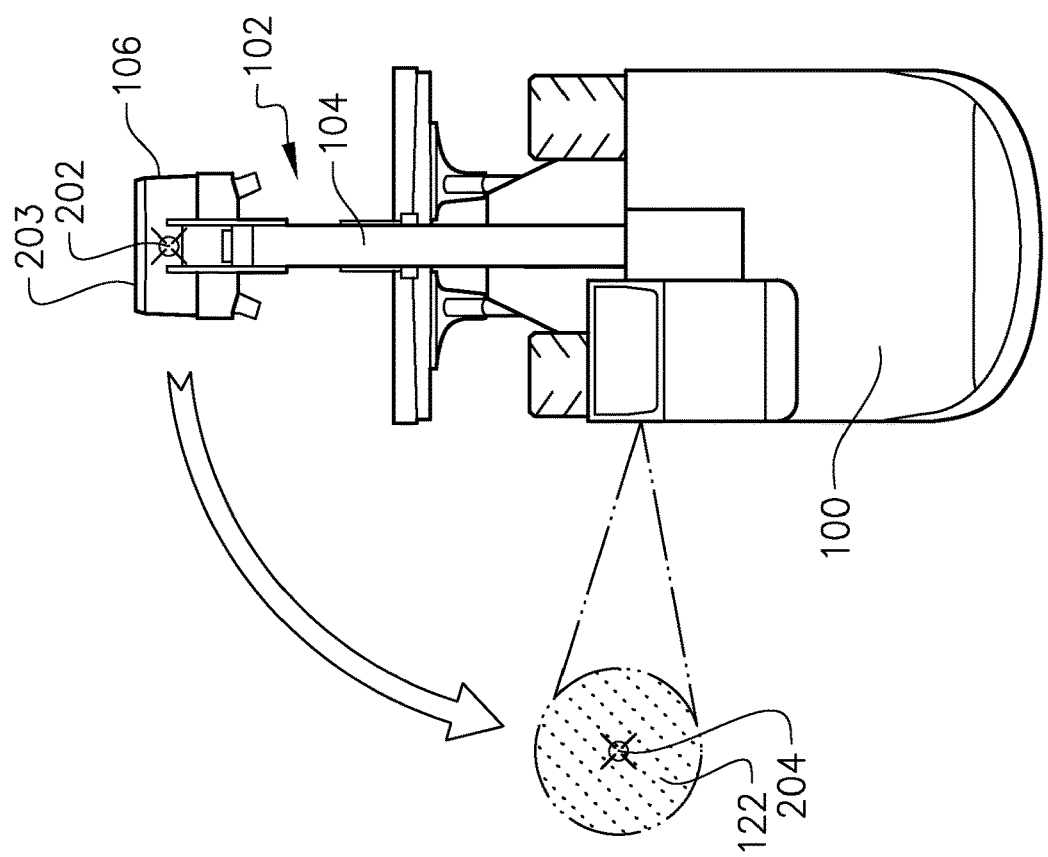

Turning to FIG. 2b, the illumination arrangement 504 is in this embodiment arranged to illuminate a ground surface at the determined future position 204 which corresponds to the shape of the load unit arrangement 102. Hereby, the illuminated ground surface 122 forms a vertical projection of the load unit arrangement 102 on the ground surface. An advantage is that a clear and intuitive illustration of the boom arm 104 and the implement 106 of the load unit arrangement 102 is provided to the ground surface at which it may be hazardous to be positioned.

With reference to FIG. 2c, the illumination arrangement 504 is in this embodiment arranged to illuminate an area of the ground surface which corresponds to a vertical projection of a swept area formed by the movement of the load unit arrangement 102 from the present position 202 towards the determined future position 204. Hence, an illuminated ground surface 122 is provided to the ground surface where there is a risk that either the boom arm 104 or the implement 106 will collide with e.g. a person when the load unit arrangement 102 is moved from the present position 202 towards the future position 204.

Finally, reference is made to FIG. 2d which illustrates a further example embodiment of an illuminated ground surface 122 at the future position 204. In FIG. 2d, the illumination arrangement 504 is arranged to illuminate an area of the ground surface at the future position 204, which illuminated ground surface 122 is formed by an extension between a vertical projection of the outermost position 203 of the load unit arrangement 102 and the body structure 140 of the working machine 100. Hereby, an area extending into the body structure 140 of the working machine 100 is illuminated.

Turning now to FIG. 3, which illustrates a working machine in the form of a wheel loader 300. The wheel loader 300 in FIG. 3 is also provided with an example embodiment of the above described warning system 500. The wheel loader 300 comprises a load unit arrangement 102 having a boom arm 104 and an implement 106 in the form of a bucket. The load unit arrangement 102 is movable such that the implement 106 can be lifted/lowered relative to the ground surface 118 in front of the body structure of the wheel loader 300.

As depicted in FIG. 3, the load unit arrangement 102 is arranged in a present, lifted position. The load unit position prediction means 502 then determines the future position of the load unit arrangement 102, which determined future position corresponds to a position closer to the ground surface compared to the present position. The determined future position of the load unit arrangement 102 is illustrated with dashed lines 306. The load unit arrangement 102 thus moves in a direction of the arrow 308.

The illumination arrangement 504 in the embodiment of FIG. 3 is arranged to illuminate an area of the ground surface in front of the wheel loader 300. This illuminated ground surface 122 constitutes a hazardous area when the load unit arrangement 102 is lowered from the present position.

Moreover, the illumination arrangement 504 is arranged to illuminate the ground surface with an intuitive warning message 310 that clearly illustrates that the area should not be entered. This is depicted in FIG. 3 with a hand sign, although other alternatives are conceivable, such as e.g. a stop sign or a text message, etc.

The warning system described above is also applicable for other type of vehicles as well, and reference is therefore made to FIG. 4 which illustrates a working machine in the form of a dump truck 400 provided with the warning system 500 according to an example embodiment. The dump truck 400 comprises a load unit arrangement 102 in the form of a container which is lifted and lowered by means of hydraulic cylinders.

The load unit arrangement 102 of the dump truck 400 can be tilted relative to a tilt axis 404. Hereby, the load unit arrangement 102 can be tilted in order to e.g. release a load which is present in the container. The load unit arrangement 102, or the container, can be raised to a position which is indicated by dashed lines 406. The load unit position prediction means 502 determines that the container will be moved from the present position towards the future position indicated by dashed lines 406. The illumination arrangement 504 will, when the load unit position prediction means 502 has determined that the container will be tilted, illuminate the ground surface behind the dump truck 400. The illuminated ground surface 122 corresponds to the position where the load from the container will land, which is thus a potentially hazardous area. The illuminated ground surface 122 is in FIG. 4 provided with a warning sign in the form of a "no parking" indication for intuitively warn persons in the vicinity thereof that the illuminated ground surface may become hazardous.

Figure 5:
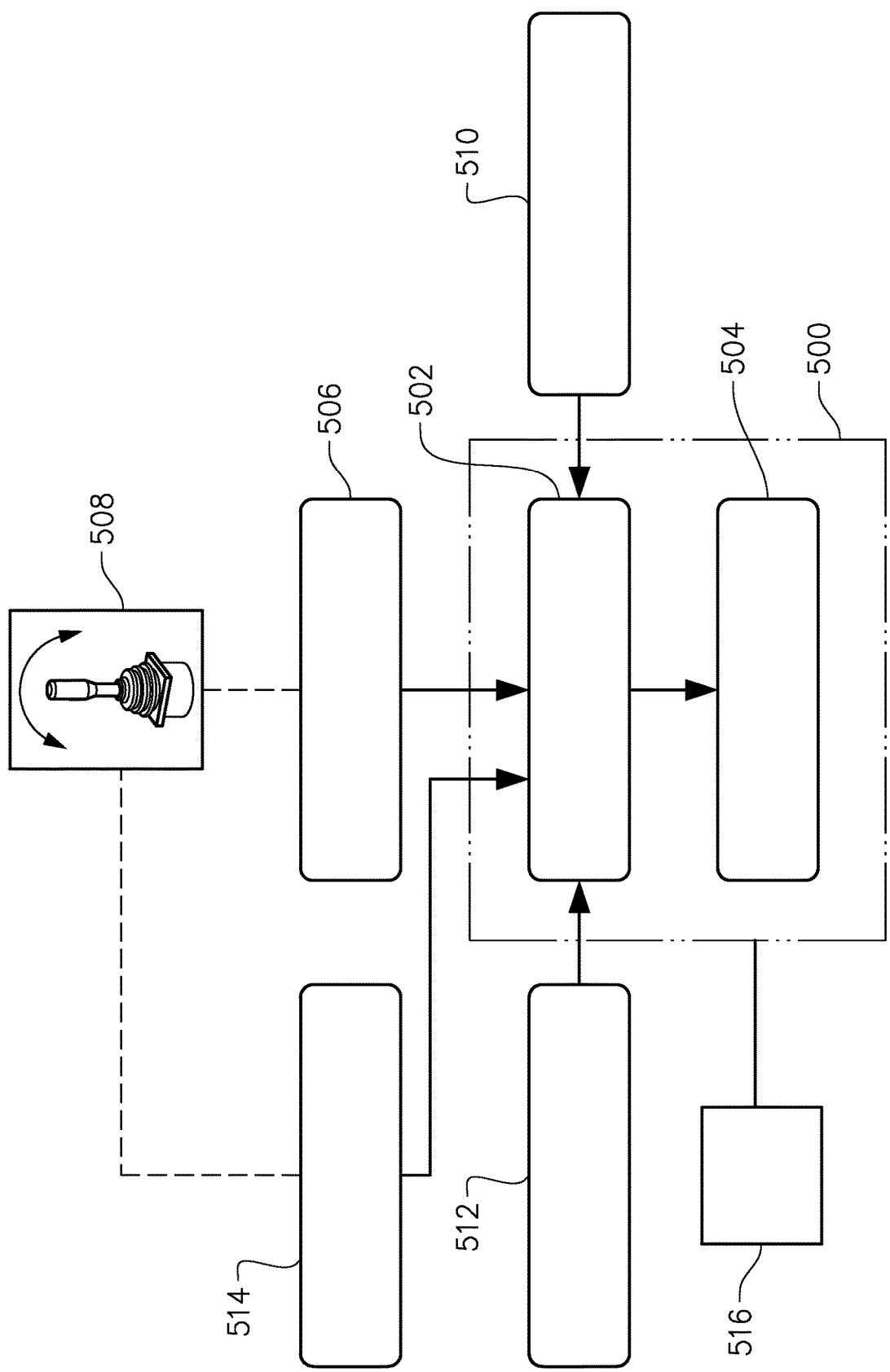
FIG. 5 is a schematic illustration of the warning system according to an example embodiment of the present invention.

In order to describe the warning system 500 in further detail, reference is made to FIG. 5. FIG. 5 is a schematic illustration of the warning system 500 and how it is connectable to different modules for receiving input parameters for controlling the illumination arrangement 504. As described above and illustrated in FIG. 5, the warning system 500 comprises the load unit position prediction means 502 which is arranged to determine a future position of the load unit arrangement 102, and the illumination arrangement 504 for illuminating the area externally of the working machine 100. Thus, and as described above, the illumination arrangement 504 illuminates the area on the basis of the future position of the load unit arrangement 102 determined by the load unit position prediction means 502. The following will describe various modules and functionalities enabling the load unit position prediction means 502 to determine the future position of the load unit arrangement 102.

Firstly, the load unit position prediction means 502 is connectable to an operator command module 506. The operator command module 506 is arranged to receive a signal indicative of how the operator of the working machine 100 is intending to operate the load unit arrangement 102. The signal may be received from e.g. an operator command device 508, such as a joystick or the like arranged in the cabin compartment of the working machine. Hereby, the load unit position prediction means 502 may receive a signal indicative of a load intensity exerted on the operator command device 508, and by means of the detected load intensity determining the future position of the load unit arrangement 102. Instead of, or in combination with the intensity of the operator command device 508, the load unit position prediction means 502 may also receive a signal indicative of an amount of deflection of the operator command device 508 for determining the future position of the load unit arrangement 102. If the operator of the working machine controls the operator command device 508 relatively hard and/or deflects the operator command device to a relatively large degree, the load unit position prediction means 502 determines that the load unit arrangement 102 will be moved to a future position relatively far away from the present position. Conversely, a light force on the operator command device 508 and/or a small deflection of the operator command device 508 indicates that the load unit arrangement 102 will be moved to a future position relatively close to the present position. The deflection and/or the load intensity of the operator command device 508 can be determined by using a suitable sensor, etc.

The load unit position prediction means 502 is also connectable to a driving direction module 510. The driving direction module 510 is arranged to determine a present and/or a future driving direction of the working machine 100. The driving direction module 510 may also be arranged to determine a present and/or a future vehicle speed of the working machine 100. By means of the determined driving direction and/or vehicle speed of the working machine 100, the load unit position prediction means 502 may determine the future position of the load unit arrangement 102 caused by the driving direction, and the time period until it will arrive at the future position based on the determined vehicle speed. Thus, if it is determined that the working machine will turn left, the future position of the load unit arrangement will also most likely be to the left of the present position. The driving direction module 510 may receive input relating to the driving direction of the working machine 100 from various sensors, such as externally positioned sensors arranged to visually "see" the direction of driving, or from a sensor connected to the steering wheel or the ground engaging members for detecting an input command from the operator of the working machine 100.

Moreover, the load unit position prediction means 502 is also connectable to an implement load detection module 512. The implement load detection module 512 is arranged to detect a load carried by the load unit arrangement 102, or in particular, a load carried by e.g. the implement 106 of the load unit arrangement 102. By means of the determined load carried by the load unit arrangement 102, the load unit position prediction means 502 may determine a time period until the load unit arrangement 102 will arrive at the determined future position. The implement load detection module 512 may determine the load carried by the load unit arrangement 102 by means of a load sensor or the like. The load may also be determined by determining the hydraulic pressure level in the hydraulic system connected to the load unit arrangement 102, which is an indication of high/low loads. A large hydraulic pressure thus corresponds to a relatively high load in the bucket while a low hydraulic pressure corresponds to a relatively low load in the bucket.

Still further, the load unit position prediction means 502 is also connectable to a load unit movement look-up table 514. The load unit movement look-up table 514 is arranged to store movements of the load unit arrangement 102, where each stored movement corresponds to a respective operator command from an operator of the working machine. The operator command may, for example, be received from a sensor connected to the above described operator command device 508. Hereby, the load unit position prediction means 502 can receive input based on previous actions, i.e. based on statistics. Thus, the load unit movement look-up table 514 is arranged to receive a signal indicative of an operator command from the operator, and to transmit a control signal to the load unit position prediction means 502, which control signal comprises information relating to a stored future position of the load unit arrangement 102 corresponding to the current operator command from the operator.

Although the above description in relation to FIG. 5 have separately described the various input signals to the load unit position prediction means 502, it should be readily understood that the load unit position prediction means 502 may receive signals from more than one of the modules simultaneously and determine the future position of the load unit arrangement 102 based on an overall assessment of the received signals. For example, the load unit position prediction means 502 may receive signals from the operator command module 506 and the driving direction module 510 and thereafter determine, based on a combination of these signals, the future position of the load unit arrangement 102. The load unit position prediction means 502 is thus provided with a logic unit for determining such future position of the load unit arrangement 102.

Figure 6:
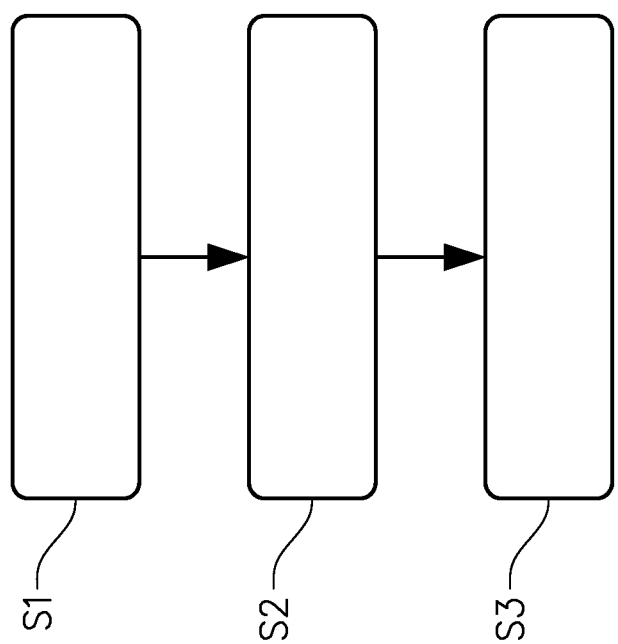
FIG. 6 is a flow chart illustrating an example embodiment of a method for controlling the warning system.

In order to sum up and describe the method for controlling the warning system of the working machine, reference is made to FIG. 6 illustrating a flow chart thereof. Firstly, a signal is received S1 for indicating a moving operation of the load unit arrangement 102. The signal may be received from one or more of the modules/means described above in relation to FIG. 5. Based on the received signal, the future position of the load unit arrangement is determined S2. The step of determining the future position may be executed by the load unit position prediction means 502. Finally, on the basis of the determined future position, the illumination arrangement 504 is controlled S3 to illuminate the area externally of the working machine 100.

It is to be understood that the present invention is not limited to the embodiment described above and illustrated in the drawings; rather, the skilled person will recognize that many changes and modifications may be made within the scope of the appended claims. As an example, the signal indicative of a moving operation of the load unit arrangement may also be received from a remote control or a personal computer acting as an operator of the working machine.

The invention claimed is:

1. A warning system for a working machine, the working machine comprising a movable load unit arrangement, said warning system comprising an illumination arrangement arranged to illuminate an area externally of said working machine;
    wherein the warning system further comprises a load unit position prediction module connected to an operator command module of the working machine, the load unit position prediction module being adapted to receive a control signal from the operator command module, said control signal being indicative of the future position of said load unit arrangement, wherein the load unit position prediction module is arranged to determine a position of said load unit arrangement at a future point in time, said illumination arrangement being arranged to illuminate the area on the basis of the determined future position of the load unit arrangement,
    wherein the illumination arrangement is arranged to illuminate a ground surface, the illuminated ground surface having an area corresponding to a vertical projection of a swept area formed by the movement of the load unit arrangement from a present position towards the determined future position, and
    wherein the operator command module is connected to an operator command device controlled by an operator of the working machine, wherein the future position of the load unit arrangement is determined based on a load intensity and amount of deflection exerted on the operator command device.

2. The warning system according to claim 1, wherein said illumination arrangement is arranged to illuminate the area prior to said load unit arrangement arriving at the determined future position.

3. The warning system according to claim 1, wherein said illumination arrangement is arranged to illuminate a vertical projection of an outermost position of the load unit arrangement at the future point in time.

4. The warning system according to claim 3, wherein said illuminated ground surface forms an area corresponding to the shape of the load unit arrangement.

5. The warning system according to claim 1, wherein the illuminated ground surface forms an area between a vertical projection of an outermost position of the load unit arrangement and a body structure of the working machine.

6. The warning system according to claim 1, wherein the load unit position prediction module is connectable to an implement load detection module, wherein the load unit position prediction module is adapted to determine a time period from a present point in time to said future point in time for the movement of the load unit arrangement based on a signal received from the implement load detection module.

7. The warning system according to claim 1, wherein the load unit position prediction module is connectable to a driving direction module arranged to determine a driving direction of the working machine, wherein the future position of said load unit arrangement is based on the determined driving direction of the working machine.

8. The warning system according to claim 1, wherein the load unit position prediction module is connectable to a load unit movement look-up table configured to store positions of the load unit arrangement, said stored positions correspond to respective operator commands from an operator of the working machine, wherein the future position of the load unit arrangement is based on an operator command and a corresponding stored position of the load unit movement look-up table.

9. A working machine comprising a movable load unit arrangement, wherein the working machine comprises a warning system according to claim 1.

10. The working machine according to claim 9, wherein said working machine is an excavator and said load unit arrangement comprises a boom arm and an implement.

11. The working machine according to claim 10, said excavator comprising an upper and a lower structure, wherein said load unit arrangement is arranged on said upper structure and movable relative the lower structure.

12. A method for controlling a warning system of a working machine, the working machine comprising a movable load unit arrangement, said warning system comprising an illumination arrangement arranged to illuminate an area externally of said working machine, the method comprising:
   receiving a signal indicative of a moving operation of said load unit arrangement;
   determining a future position of said load unit arrangement based on the received signal of the moving operation of said load unit arrangement, the moving operation being based on a load intensity and amount of deflection exerted on an operator command device of the working machine; and
   controlling said illumination arrangement to illuminate the area on the basis of the determined future position, the area corresponding to a vertical projection of a swept area formed by the movement of the load unit arrangement from a present position towards the determined future position.

13. A non-transitory computer readable medium carrying a computer program comprising computer readable program instructions for performing the operations of claim 12 when said instructions are run on a computer.

14. A control unit arranged to control a warning system of a working machine, the working machine comprises a movable load unit arrangement, wherein the warning system comprises an illumination arrangement arranged to illuminate an area of a ground surface externally of said working machine;
   wherein the control unit is configured to:
   receive a signal indicative of a moving operation of said load unit arrangement;
   determine a future position of said load unit arrangement based on the received signal of the moving operation of said load unit arrangement, the moving operation being based on a load intensity and amount of deflection exerted on an operator command device of the working machine; and
   control said illumination arrangement to illuminate the area on the basis of the determined future position, the area corresponding to a vertical projection of a swept area formed by the movement of the load unit arrangement from a present position towards the determined future position.

* * * * *